Sept. 6, 1938.　　　　A. E. FISHER　　　　2,129,350
AUTOMATIC CLUTCH CONTROL
Filed May 9, 1931
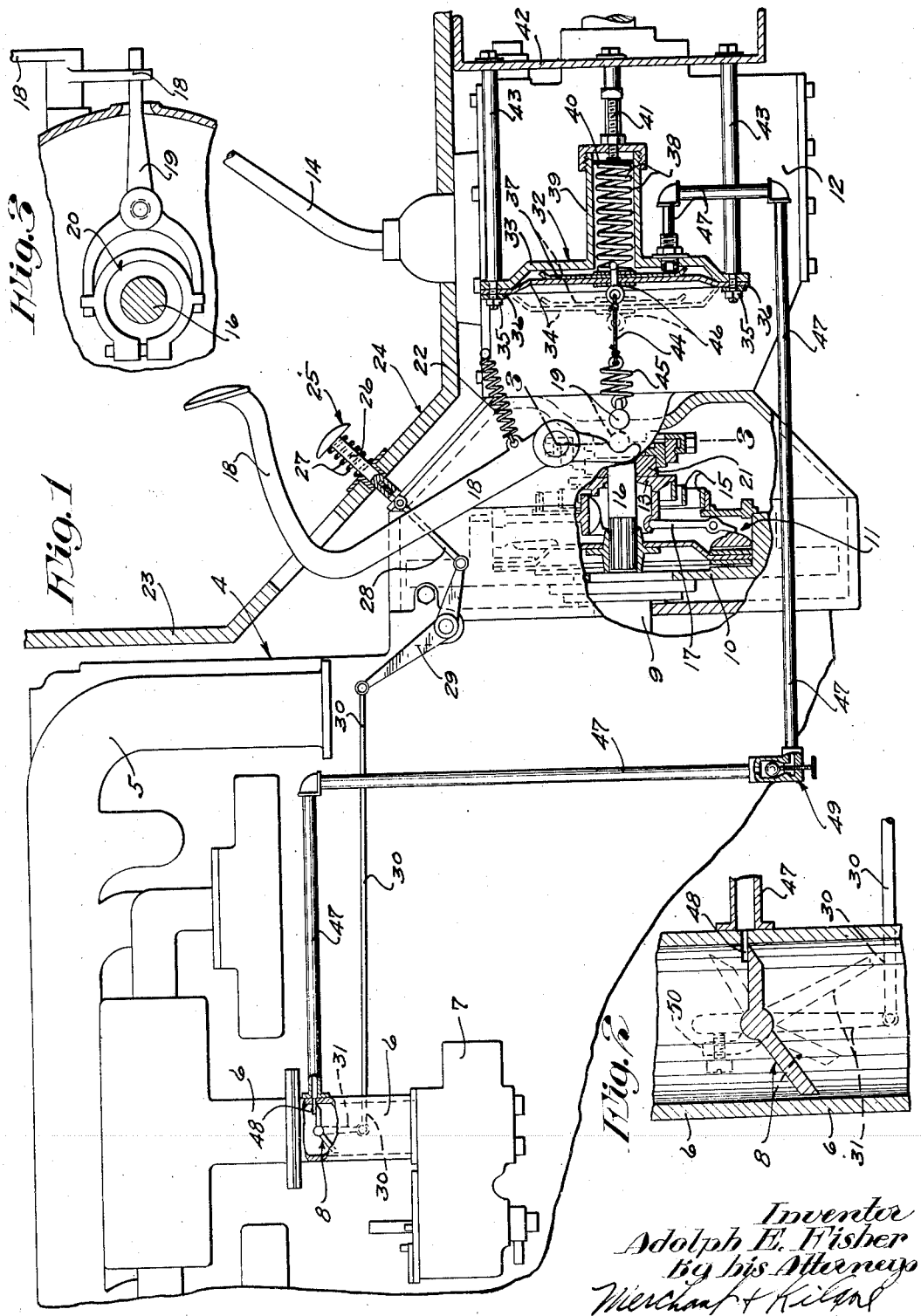
Inventor
Adolph E. Fisher
By his Attorneys
Merchant & Kilian Patented Sept. 6, 1938

2,129,350

UNITED STATES PATENT OFFICE 2,129,350

AUTOMATIC CLUTCH CONTROL

Adolph E. Fisher, Minneapolis, Minn., assignor to A. Parker-Smith, New York, N. Y., as trustee Application May 9, 1931, Serial No. 536,196

21 Claims. (Cl. 192—.01)

This invention relates to mechanism for automatically operating friction clutches that are interposed in the driving connections of automobiles and the like and has among its objects the provision of an extremely simple, highly efficient and comparatively inexpensive mechanism of the class described.

A specific object of the invention is the provision of means for operating friction clutches in the driving connections of internal combustion engines, from the suction created by the engine's intakes of fuel and to automatically control the said suction operated means by the engine's intake regulating throttle valve.

Another specific object of the invention is the provision in combination with a friction clutch and a motor for operating the clutch, of a novel connection between the clutch and motor, which will render setting and releasing of the clutch desirably gradual and smooth. The above and other important objects and advantages will be made apparent from the following specification and claims.

Generally stated, the invention consists of novel devices, combinations of devices and arrangement of parts hereinafter described and defined in the claims.

In the accompanying drawing, which illustrates the invention, like characters indicate like parts throughout the several views.

Referring to the drawing:

Fig. 1 is a fragmentary diagrammatic view of an automobile incorporating my invention, some parts being shown in full, some parts being broken away, and some parts being shown in section;

Fig. 2 is an enlarged fragmentary view in axial section of a portion of the engine intake manifold and certain associated parts shown in Fig. 1; and Fig. 3 is a detail sectional view taken on the line 3—3 of Fig. 1.

Describing first the customary parts of the automobile, the number 4 indicates generally the internal combustion engine which is provided with the usual exhaust manifold 5, the usual manifold having the fuel intake conduit 6, the usual caburetor 7, and the usual throttle valve 8 interposed in the intake conduit 6 for controlling the same and thereby govern the speed of the engine 50 being the usual stop for holding such throttle in idling position. The engine crank shaft is indicated by the numeral 9 and the usual fly-wheel mounted on one end thereof by the numeral 10. The driving connections from the engine 4 include the usual friction clutch indicated by 11, the usual variable speed transmission indicated by the numeral 12, and a drive shaft indicated by 16. The transmission 12 is provided with a shifting lever 14.

The clutch 11, which is contained within and formed partly by the fly-wheel 10, is of the well-known single disc type and is normally yieldingly set in driving engagement by a heavy spiral spring 15 that acts through a sliding collar 13 and levers 17. The clutch 11 is arranged to be controlled manually in the ordinary manner by mechanism involving a foot-operated lever 18, shipper fork 19, shipper collar 20, and a throw out bearing 21 interposed between shipper collar 20 and collar 16. The lever 18 is normally in a rearwardly extended position and is held in this position independent of the clutch spring 15 by a relatively light spring 22 that is anchored at one end to the case of the transmission and at its other end to said lever 18. When the clutch lever 18 is depressed, its cooperating parts, actuated thereby, react against and overcome the clutch spring and release the clutch thereby uncoupling the engine from the drive shaft.

The customary dash board of the automobile is indicated by 23, the customary floor boards by 24 and the customary foot-operated accelerator by 25. This accelerator 25, as illustrated, comprises a plunger 26 that is arranged to work through the floor boards and is normally held in an upwardly extended position by means of a spring 27. This accelerator is arranged to operate the throttle valve 8 and to normally hold the same in a substantially closed idling position by means of connections comprising a link 28, an intermediately pivoted lever 29, a long link 30 and a throttle valve-actuating arm 31.

In the preferred form of the invention illustrated, automatic control of the automobile clutch 11 is acocmplished by means of a fluid pressure device in the form of a suction motor 32 that is operated by suction produced in the intake manifold of the engine and arranged to be controlled by the throttle valve 8 under action of the accelerator 25. This suction motor preferably comprises a suction chamber forming casing 33 that is open at one end, a flexible diaphragm 34 secured at its periphery to the open end of the casing 33 by means of nut-equipped bolts 35 and a clamping ring 36, a reinforcing disc 37 applied to the inside of the diaphragm 34, and an adjustable compression spring 38 applied within an axially extended reduced tubular portion 39 of the casing 33 and arranged to react against the diaphragm 34 and a swivelled end 40 of an adjustment screw 41. The spring 38 tends to hold the diaphragm 34 in an extended inoperative position shown by dotted lines in Fig. 1. The motor casing 33 is secured to fixed parts of the vehicle by means of a rigid bracket 42 and spacers 43. The diaphragm 34 is connected to the outer end of the shipper fork 19 which projects through the casing of the customary manual clutch control mechanism (see Fig. 3) by an elastic connection comprising a cable 44 and a coil tension spring 45 and an eye bolt 46.

The throttle valve employed is of the butterfly type but differs from the conventional in that the oppositely projecting wings thereof instead of being spaced 180 degrees apart in the ordinary manner are spaced considerably less than 180 degrees apart, and said valve is so shaped that when it is in idling position one wing thereof extends at right angles to the axis of the intake conduit and close to the wall thereof, while the other wing of said valve will be in a position somewhat beyond right angles to the conduit wall on its side, so that any slight engine accelerating movement of the throttle will produce a greater degree of opening on the last mentioned side of the intake passage than on the other. The edge portion of the first mentioned wing is preferably made thin.

It should, of course, be understood that a partial vacuum or suction is ever present in the intake during operation of the engine and that the degree of vacuum or suction is varied greatly by the throttle valve. It will be apparent that the degree of vacuum or suction in the zone of the intake above the valve will be greatest when the valve 8 is in its idling position, where it most greatly restricts the intake, and at this time the vacuum or suction in the intake below the valve will be at a minimum. This difference in degrees of suction in the intake zones below and above the throttle valve is equalized as the throttle is moved to an open, engine accelerating position and the degree of suction present in the manifold is materially decreased with such opening of the valve.

The suction chamber of the suction motor 32 is connected to the engine intake conduit 6 by a suitable suction pipe or tube 47 and a port 48 in the wall of such conduit 6. This port 48 is preferably in the form of a relatively narrow slot that is extended in parallel relation to the axis of the butterfly throttle valve 8. The port 48 is closely associated with the wing of the valve 8 that is at right angles to the axis of the intake conduit when said valve is in an idling position and the relation of the last said valve wing to the port is such that said port will be subject to action of the high suction zone of the intake when the valve is in its idling position and said valve wing will move over the port and cut off the same from the high suction zone under initial engine accelerating movements of the valve.

Operation

The diaphragm 34 of the suction servo motor 32 is obviously constantly subject to suction of the engine intake, during operation of the engine, and will therefore always be under pressure of the atmosphere to move its operative clutch released position but will not have sufficient power to overcome the spring 38 except under maximum suction produced when the throttle valve is moved to its idling position, at which time the diaphragm will have sufficient pressure to overcome both the spring 38 and the clutch spring 15 and effect complete release of the clutch. By proper adjustment of the spring 38, the suction motor can be rendered so completely inoperative during ordinary operation of the vehicle, with the throttle valve in an accelerated position, that a slight slack normally existing in the elastic connection between the diaphragm 34 and the shipper fork 18 will not be taken up and therefore the ordinary clutch releasing connections will not be subject to any pressure except when the throttle valve is closed. The rapidity of clutch releasing movements may also be controlled to a great extent by adjustment of the spring 38.

The clutch will be automatically moved to a released position by the suction motor 32 every time the throttle valve 8 is moved by the accelerator or otherwise to its idling position and will be maintained in this position as long as the engine is operated at idling speed. When, however, the throttle valve is moved to accelerate the speed of the engine, the wing of the valve most closely associated with the port 48 will begin to move over and rather gradually cut off said port from the high suction zone of the intake thereby reducing the power of the motor and permitting the clutch to be set by its spring 15.

It is, of course, well-known that friction clutches should be set gradually to avoid jerking and undue strain on the driving connections of the vehicle and to this end I interpose a one-way adjustable check valve 49 in the suction line 47. This check valve 49 is arranged to permit free discharge of air from the suction motor, to thereby permit relatively quick release of the clutch but to retard return of air to the suction motor and thereby render return of the clutch slow.

Another important factor in effecting smooth operation of the clutch is the elastic connection between the suction motor and shipper fork 18. This connection stretches under clutch releasing strain and gives up its load gradually under clutch setting movements after initial contact of the friction driving surfaces thereby permitting a desired slippage of the clutch before its driving surfaces are brought into positive driving contact.

By means of my clutch control mechanism illustrated, operation of the clutch is rendered so completely automatic and so smooth that the customary manual clutch control mechanism could be entirely done way with or at least need not be used. The vehicle can be started smoothly from a stand-still and shifted through all transmission gears without difficulty and the vehicle will coast free of the engine whenever the throttle valve is in a closed idling position.

Among the advantages of the invention may be mentioned the simplification, and reduction in number, of parts required for use in the combined control mechanism for adjusting the delivery of combustible mixture to the carburetor uptake 6 and of atmospheric or subatmospheric pressures to the conduit 47, variations in which pressures energize the vacuum-operated servomotor which actuates the clutch 11. By the use of my present invention both these functions are dominated by simple oscillation of the valve 8 about its axis. Consequently there is needed only a single, simple connection to the usual accelerator pedal 25 for so oscillating said valve,— which is already in use on every motor car. This simplification results not only in economy of first cost, but also renders the invention convenient of application to motor cars which may already have much apparatus crowded under the engine hood,—some of which might interfere with the installation of any second, separate chain of connections from the accelerator to any other valve installed for controlling the varying degrees of pressure to be established in such conduit 47 from time to time for energizing the servo-motor, in addition to that already in use for controlling the carburetor throttle. When my present invention is used such original carburetor control connection from the accelerator performs a double function, since it also controls the operation of the servo-motor.

Various changes could be made in the details of the construction here shown as constituting an embodiment of the above outlined basic idea of means without departing from such idea if the relative arrangement of essential elements and/or mode of operation herein set forth be retained and substantially the same results produced in substantially the same way,—so long as such modifications come within the definitions of the appended claims, or some of them.

What I claim is:

1. In a vehicle the combination with an internal combustion engine and driving connections including a friction clutch and yielding means tending to set the clutch, of means for operating the said friction clutch from suction produced in the engine's intake including a suction motor operative to react against said yielding means and effect release of the clutch, a suction connection between said motor and the engine intake, means for controlling suction to the suction motor, and an adjustable check valve interposed in the suction connection and being operative to retard resetting movements of said clutch under the action of said yielding means.

2. In a vehicle, the combination with an internal combustion engine having an intake and driving connections including a clutch and yielding means tending to set the clutch, of a suction motor adapted and arranged to oppose said yielding means and effect release of the clutch, a port in the intake, a suction connection between said port and said suction motor, and a butterfly throttle valve in said intake for controlling the intake and thereby regulate the speed of the engine and which valve, when in a substantially closed idling position, greatly restricts the intake and causes a high degree of suction therein in the zone beyond said valve, said port communicating with the high suction zone of the intake when the butterfly throttle valve is in an idling position thereby rendering the suction motor operative to release the clutch, said butterfly valve being arranged so that one wing thereof is closely associated with said port and is operative under initial accelerating movements of the valve to move over said port and cut off the same from the high suction zone of the intake before the speed of the motor has been materially increased or the suction in the high suction zone materially reduced, said port being in the form of a relatively narrow slot extending in parallel relation to the axis of the butterfly throttle valve.

3. In a vehicle, the combination with an internal combustion engine having an intake and driving connections including a clutch and yielding means tending to set the clutch, of a suction motor adapted and arranged to oppose said yielding means and effect complete release of said clutch, a throttle valve in the intake for controlling the same and thereby regulate the speed of the engine, and which valve, when in a substantially closed idling position, greatly restricts the intake and causes a high degree of suction therein in the zone therebetween and the engine, a port leading to said intake and a suction connection between said port and said suction motor, the relation of said throttle valve to said port being such that the port will be open to the zone of high degree suction when the throttle valve is in an idling position and initial accelerating movements of said throttle valve will act to cut off said port from the zone of high degree suction before it has moved sufficiently to materially increase motor speed or materially reduce the suction in the high degree suction zone, and an adjustable check valve interposed in said suction connection and being operative to retard resetting movements of the clutch.

4. In a vehicle, the combination with an internal combustion engine having an intake, a throttle valve in the intake for controlling the same, driving connections from the engine including a normally set clutch and yielding means tending to set the clutch, of a clutch operating suction motor arranged to oppose the yielding clutch setting means and effect release of the clutch, a port in the intake, said port being in the form of a relatively narrow slot extending transversely to the line of movements of an adjacent portion of the throttle valve and being so located, in respect to the throttle valve, that it will be on the engine side thereof and subject to high degree suction when the throttle valve is in an idling position and will be moved over by said valve under initial accelerating movements thereof, and a suction connection between the said port and suction motor.

5. In a vacuum-power clutch-operating mechanism comprising a clutch-actuating member, and a pneumatic power-producing device operatively connected to said member, the combination, with said above described apparatus, of a carburetor having a mixture conduit and a throttle valve mechanism for controlling the flow of air through said conduit in which the wall of said conduit is provided with a port adjacent the edge of said valve when the latter is in closed position, and on that side of said valve edge toward which it moves when the valve opens, combined with a conduit exterior of said valve, connected to said airport at one end, and to said vacuum power mechanism at the other end; whereby variations in degree of air pressure in said exterior conduit may be developed and said vacuum power mechanism energized by opening or closing said throttle valve when the carburetor is operatively connected to a gas engine.

6. A combination such as defined in claim 5 in which said throttle valve is of the butterfly type, and in which said port has the form of a slot through the mixture conduit wall lying in a plane substantially parallel to that of said valve and located on that side of the valve edge which is adapted to be connected to the intake manifold when said carburetor is operatively connected to an internal combustion engine of the compression type.

7. In a vacuum-power, clutch-operating mechanism comprising a clutch-actuating member, and a pneumatic power-producing device operatively connected to said member, the combination, with said above described apparatus, of a carburetor having a mixture conduit and a throttle valve controlling the flow of a combustible gaseous mixture therethrough, in which carburetor a wall of said conduit is provided with a valve port extending therethrough adjacent one edge of said throttle valve, when the latter is in closed position, and on that side thereof toward which it moves when opened to permit a flow of said gaseous mixture through said conduit, said valve port being connected to said pneumatic power-producing device.

8. The combination, with the intake of a carburetor, a throttle valve for controlling the flow of combustible mixture to said intake which is oscillatory about a fixed axis, and a conduit in which varying degrees of air pressure are to be established from time to time, of means communicating with said intake and disposed in cooperative valvular relation with the throttle valve for controlling the degree of pressure in such conduit, said means being operative for such purpose during at least portions of the periods of movement of said throttle valve.

9. A combination such as defined in claim 8 in which said means is adapted to produce an increase of pressure in said conduit before any considerable degree of opening of said throttle valve has occurred.

10. A combination such as defined in claim 8 in which said means is adapted to produce an increase of pressure in said conduit before any considerable degree of opening of said throttle valve has occurred, and to produce a very considerable decrease of pressure therein before complete closing of said valve can occur.

11. A combination such as defined in claim 8 in which said means is adapted to effect such changes in air pressure in said conduit substantially simultaneously with the initiation or cessation of flow of any considerable quantity of combustible mixture through said carburetor intake.

12. In a vehicle the combination with an internal combustion engine having an intake and driving connections including a clutch and yielding means tending to set the clutch, of a suction motor adapted and arranged to oppose said yielding means and effect release of said clutch, a throttle valve in the intake for controlling the same and thereby regulating the speed of the engine, and which valve, when in substantially closed idling position, greatly restricts the intake and causes a high degree of suction therein in the zone between it and the engine, a port leading to said intake and a suction connection between said port and said motor, the relation of said throttle valve to said port being such that the port will be open to the zone of high degree suction when the throttle valve is in an idling position, and initial accelerating movements of said throttle valve will act to cut off said port from the zone of high degree suction before it has moved sufficiently to materially increase motor speed or materially reduce the suction in said high degree suction zone.

13. A combination such as defined in claim 12 in which said valve is of the butterfly construction with one wing swinging across said port.

14. A combination such as defined in claim 12 in which said port has the form of a narrow slot in one wall of said intake passage extending transversely of the line of flow of fuel mixture therethrough, and said valve is of the butterfly type with one wing adapted to swing transversely of said slot.

15. A combination such as defined in claim 12 in which said port has the form of a narrow slot in one wall of said intake passage extending transversely of the line of flow of fuel mixture therethrough, and said valve is of the butterfly type with one wing adapted to swing transversely of said slot and having its edge portion which cooperates therewith of a thickness less than the width of said slot.

16. A combination such as defined in claim 12 in which said port has the form of a narrow slot in one wall of said intake passage extending transversely of the line of flow of fuel mixture therethrough, and said valve is of the butterfly type with one wing adapted to swing transversely of said slot, the axis of said valve lying in a plane extending transversely of the intake passage and lengthwise of said slot, while the other valve wing is inclined to said plane and toward any inflowing current of fuel.

17. The combination, with the clutch operating element of a motor car and a pneumatic device for actuating said element, of a carburetor having a throttle valve, a stop for preventing said throttle valve from moving beyond its initial closing position, and a port in the wall of said carburetor adjacent the edge of said valve when it is in such position, said port being located on that side of said valve edge towards which the latter moves when the throttle is opened, together with a conduit connecting said port with said pneumatic device.

18. The combination, with a vacuum-operated apparatus for actuating the clutch mechanism of a motor car, of a carburetor having a mixture conduit of circular cross section with a butterfly throttle valve of substantially circular outline pivoted therein, one of the walls of said conduit being provided at a point adjacent an edge of said valve when closed with a narrow, transversely extending port connected to said vacuum-operated apparatus; whereby said throttle valve may be moved back and forth across said port without substantially varying its throttling action on the car motor to which said carburetor mixture conduit is connected.

19. In a motor vehicle having an intake manifold for its propelling engine and a throttle valve controlling the flow of fuel mixture thereto, a clutch normally biased to closed position for transmitting power from such engine to the traction wheels of the vehicle, a vacuum-operated servo-motor so connected to said clutch as to open it when energized, a conduit connecting said manifold with the vacuum chamber of said servo-motor, and valve means automatically controlling the passage of air through said conduit so as to produce a sub-atmospheric pressure in said motor when said throttle is closed to idling position, but to admit atmospheric pressure thereto when said throttle is opened, the combination, with said above described apparatus, of a check valve in said conduit adapted to permit free passage of air through it to said manifold but to restrict inflow of air to said servo-motor vacuum chamber; whereby prompt opening movement of said clutch is effected but a slower closing movement is ensured for the purpose of avoiding clutch grabbing.

20. In a vehicle, the combination, with an internal combustion engine having an intake, a throttle valve for controlling the intake to thereby regulate the speed of the engine, and driving connections from the engine including a clutch and yielding means tending to set the clutch, of a suction motor connected to said intake at a point immediately adjacent said throttle valve and adapted and arranged to effect release of said clutch when said throttle is in a substantially closed, idling position, but to permit said yielding means to close said clutch when said throttle valve is in any position which will accelerate the speed of the engine or maintain it in operation while under load.

21. In an automotive vehicle provided with a carburetor, an intake manifold and a clutch, power means for operating the clutch including a pressure differential operated motor operably connected to the clutch, and valve means for synchronously controlling the clutch engaging operation of said motor and the passage of combustible mixture from the carburetor to the manifold.

ADOLPH E. FISHER.